United States Patent [19]

Hill

[11] Patent Number: 4,621,386

[45] Date of Patent: Nov. 11, 1986

[54] SCRAPER RINGS

[75] Inventor: Alfred Hill, Bath, England

[73] Assignee: AEPLC, Rugby, England

[21] Appl. No.: 675,201

[22] Filed: Nov. 27, 1984

[30] Foreign Application Priority Data

Nov. 30, 1983 [GB] United Kingdom ................. 8331998

[51] Int. Cl.$^4$ ............................................. E21B 33/08
[52] U.S. Cl. .......................... 15/104.01 R; 15/104.04;
15/256.5; 15/308; 166/82; 175/84
[58] Field of Search ...................... 15/104.01 R, 256.5,
15/308, 104.04; 166/82; 175/84

[56] References Cited

U.S. PATENT DOCUMENTS

| 804,921 | 11/1905 | Blackburn | 15/104.04 |
| 1,134,342 | 4/1915 | Maier | 15/104.04 X |
| 1,680,372 | 8/1928 | Fenn | 15/104.04 X |
| 1,849,201 | 3/1932 | Niemann | 15/104.04 |
| 2,169,940 | 8/1939 | Bonge | 15/104.04 |
| 2,782,436 | 2/1957 | Tomer | 15/104.04 |
| 2,813,285 | 11/1957 | Aslin et al. | 15/104.04 |
| 3,733,641 | 5/1973 | Brown | 15/210 B |
| 3,822,753 | 7/1974 | Tate | 15/210 B X |

Primary Examiner—Chris K. Moore
Attorney, Agent, or Firm—Price, Heneveld, Huizenga & Cooper

[57] ABSTRACT

A scraper ring system for removing fluid from a relatively moving cylindrical surface such as a piston rod which comprises a series of overlapping blades or leaves which are pressed against the rod surface at an acute angle either by a garter spring or when the blades are part of a continuous strip, by the natural resilience of the strip and blades. The blades are located in a housing and passages are provided for the discharge of any removed fluid.

21 Claims, 25 Drawing Figures

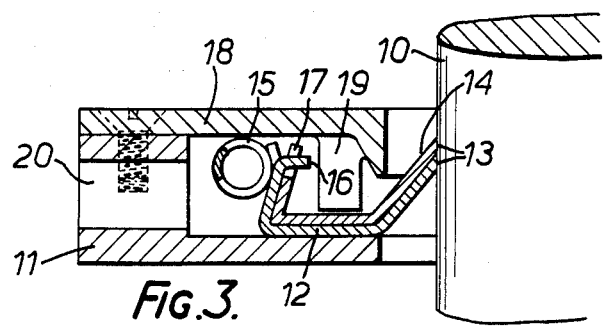
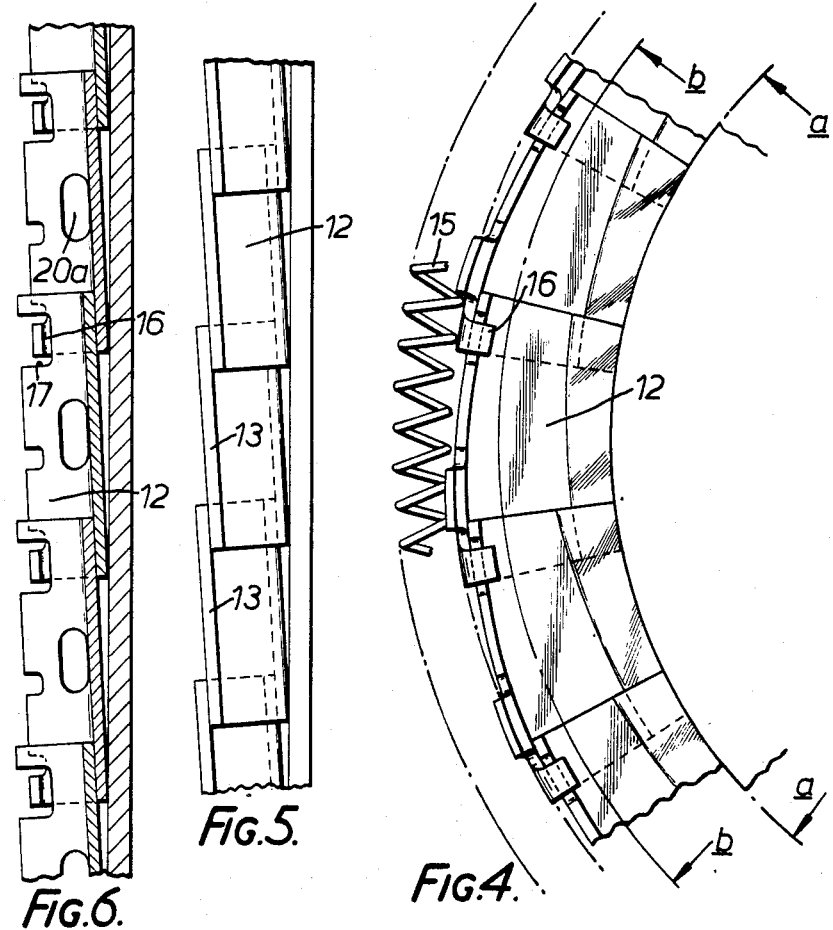

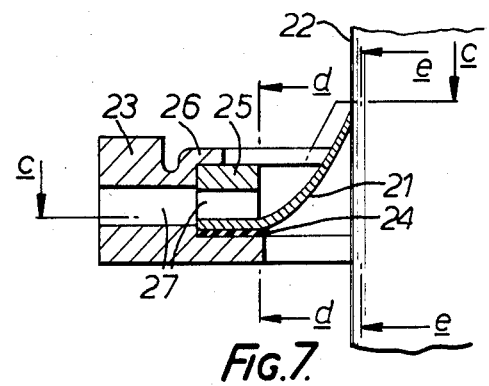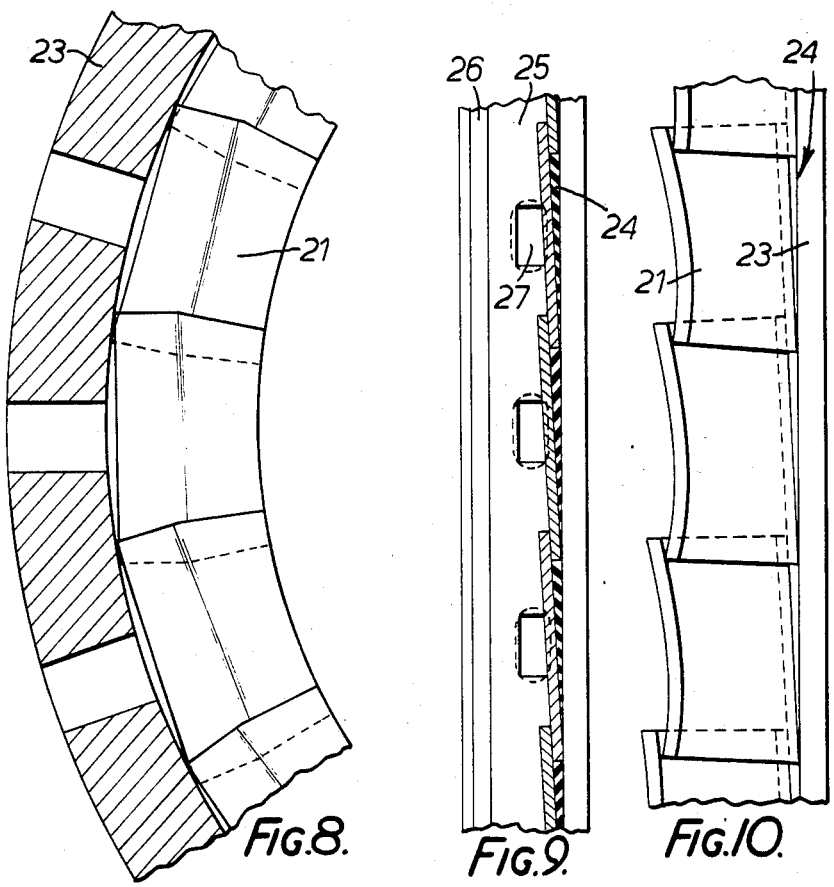

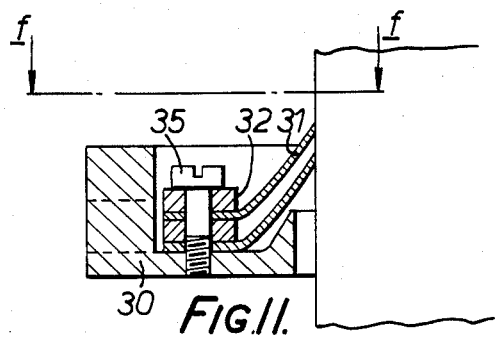
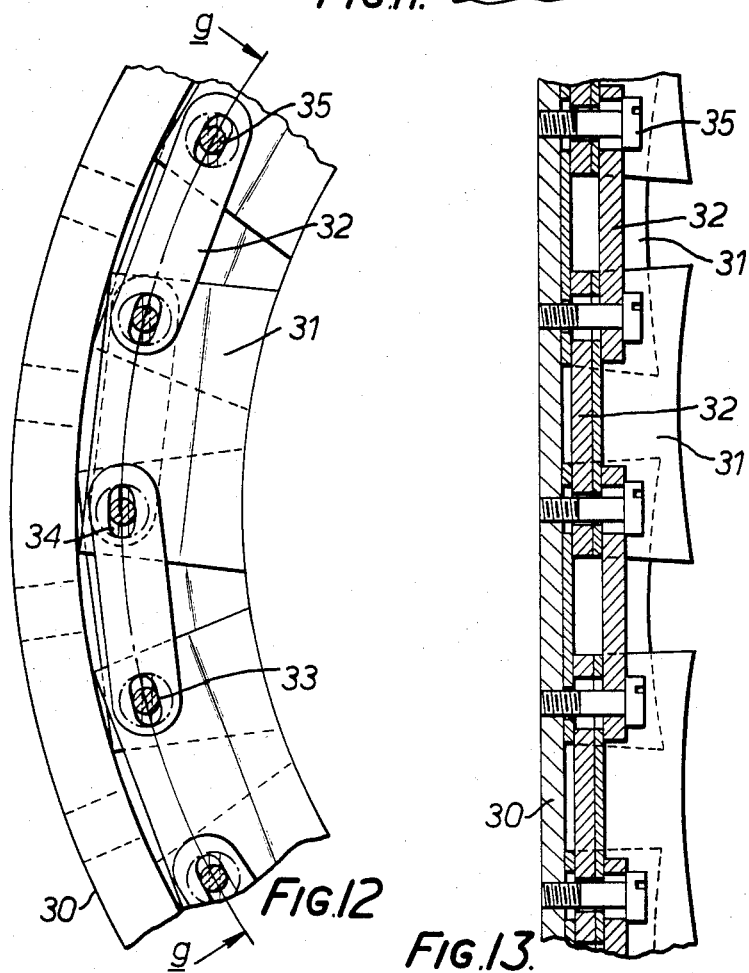

SCRAPER RINGS

BACKGROUND OF THE INVENTION

This invention relates to scraper rings for example for use in piston rod seals, particularly in low-speed diesel engines.

In many reciprocating engines and compressors the piston rod passes through a partition which separates the enclosed crankcase from either the surrounding atmosphere or a chamber containing or contaminated by the liquid or gas handled in the cylinder. Where the piston rod passes through the partition it is usual to fit some form of seal to prevent passage of fluid from one side of the partition to the other as the piston rod reciprocates. For example, it is essential to prevent oil which is adhering to the surface of the piston rod in the crankcase from passing through the seal as the piston rod moves outwards from the crankcase.

FIGS. 1 and 2 are isometric cutaway views of known forms of scraper ring which are essential components of such seals. These rings comprise a number of rigid or semi-rigid sections 1 held in contact with the piston rod 2 by a surrounding garter spring 3, the ring being supported in a close-fitting, parallel-sided groove indicated only in outline 4.

These conventional rings have been found to be not completely effective in removing all fluid from the piston rod, especially where the fluid is oil as in the crankcase, since even when the rubbing surface is initially made with sharp edges, as wear occurs the contact surface increases and the scraping action is reduced. Commonly, even though 6 or 8 rings may be fitted, the removal of surface oil is not completely effective.

SUMMARY OF THE INVENTION

It is an object of the present invention to provide an improved scraper ring system for cylindrical surfaces such as piston rods and the like with particular reference to slow speed diesel engines having vertical axis piston rods. It is desired to provide an improved performance and also a greater effective wear resistance.

According to the invention, there is provided a scraper ring system for removing fluid from a relatively moving cylindrical surface comprising a plurality of overlapping blades each having a contact edge arranged to press against the cylindrical surface at an acute angle to the cylindrical axis, the apex of the angle pointing against the relative motion. Preferably, the blades are arranged in two or more rows, the leaves in adjacent rows being staggered. The blades may be discrete components or may form part of a continuous strip. The blades may be held in contact with the cylindrical surface by external spring means, or by the natural resilience of strip and blades.

Preferably the ring incorporates channels through which the removed fluid may be removed. The blades may be produced by injection moulding and may be made of polyetheretherketone reinforced with carbon fibres. Alternatively, the blades may be produced by press forming from strip or sheet material.

The blades may be finished after assembly to the correct operating curvature by lapping or machining.

Preferably, the scraper ring is manufactured by arranging the blades in the desired orientation, maintaining the desired orientation by surrounding the components in a liquid and subsequently freezing the liquid, machining the blades while held by the frozen liquid, and subsequently melting the frozen liquid. However, the invention also extends generally to such a method for manufacturing any assembly of relatively flimsy or delicate components, and is not limited to scraper rings for piston rods and/or cylinder linings.

The liquid may incorporate a filler to add toughness to the ice. Preferably the liquid is water.

BRIEF DESCRIPTION OF THE DRAWINGS

FIG. 3 is a half-axial section through a first embodiment of a scraper ring in accordance with the invention using an external spring;

FIG. 4 is an axial view of the overlapping blades in FIG. 3 with the housing removed;

FIG. 5 is a developed view of the inside of the blades on line a—a in FIG. 4;

FIG. 6 is a developed section on line b—b in FIG. 4;

FIG. 7 is a half-axial section through a second embodiment of a scraper ring; (using the resilience of the leaves to provide the spring action) ·

FIG. 8 is an axial view of the leaves in FIG. 7 being a section on line c—c in FIG. 7;

FIG. 9 is a developed section through line d—d in FIG. 7;

FIG. 10 is a developed section through line e—e in FIG. 7;

FIG. 11 is a half-axial section through a third embodiment of scraper ring;

FIG. 12 is an axial view of the leaves on line f—f in FIG. 11;

FIG. 13 is a developed section on line g—g in FIG. 12;

Figure 1:
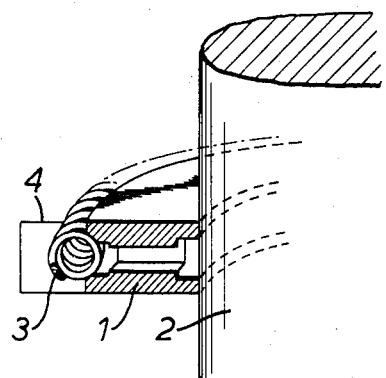
FIGS. 1 and 2 are isometric cutaway views of known forms of scraper rings.
Figure 2:
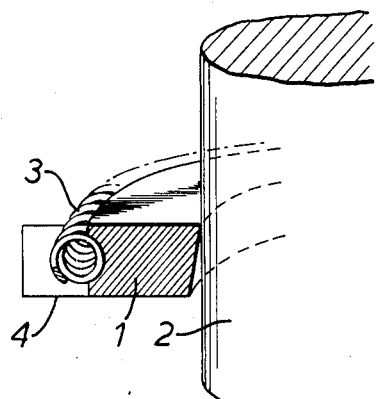

It is to be understood that in all these illustrations the blades or spring leaves are shown with the thickness greatly exaggerated for purposes of clarity.

DESCRIPTION OF THE PREFERRED EMBODIMENTS

The first embodiment of this invention as applied to a piston rod is shown in FIGS. 3 to 6 in which a scraper ring housing 11 contains a number of overlapping interlocking blades 12 formed with scraping edges 13 which contact a piston rod 10. That part 14 of the blade adjacent to the rod 10 is a generally conical form and because this is relatively rigid the blades 12 are held in contact with the rod 10 by an independent garter spring 15.

The blades 12 are secured in position with freedom to slide radially by means of a cover plate 18 having a perforated or interrupted flange 19. Drainage is provided by a series of passages 20 in the housing 11 and 20a in the blades 12.

Adjacent blades 12 are held in correct spacing by a lug 16 on one blade engaging in a slot 17 on the next. Provided the blades 12 are maintained in their correct positions the method is not material to this invention and the method illustrated is only one way of achieving correct spacing. Other ways may be used, for example, the blades may have a lug engaging in a slot in the cover plate 18 or a slot in the blade 12 may engage a rib in the cover plate 18.

A second piston rod seal is shown in FIG. 7 to 10 where the scraping blades or spring leaves 21, as they will be termed, are held in contact with the piston rod 22 by their own resilience, to achieve which the spring leaves 21 are naturally straight and their line of contact with the rod 22 becomes a curve. The spring leaves 21 are secured in a housing 23 and held on a sealing material 24 by a clamping ring 25 which is locked in position by locating a flange 26 over it, though any suitable method may be adopted including, for example, the securing of the spring leaves by an adhesive. Passages 27 extending through the clamping ring 25 and the housing 23 allow drainage.

A third piston rod seal is shown in FIGS. 11 to 13 where a housing 30 contains two rows of spring leaves 31 arranged so that the leaves 31 in adjacent rows are staggered. Spacer pieces 32 positioned on screws 35 clamp the assembly securely and space the leaves 31. The screws are preferred but any suitable devices may be substituted, for example, rivets. Furthermore, more than two rows of spring leaves may be employed.

This method is particularly suitable for the piston rods of large machinery where the quantities involved are small and the cost of elaborate tooling is disproportionate, yet there is a large range of size to be covered. With this design the spring leaves and spacers can be mass produced and only the housing need be made to suit the individual application. By using a hole 33 and slot 34 in the leaves and spacers, any diameter of ring can be constructed by varying the number of leaves in the circle, and the degree of overlap.

FIGS. 14 to 18 shows a fourth embodiment which is also intended to adapt to piston rods of any diameter, spring leaves 40 are produced in the form of straight strips, which are then bent around and fixed in a housing 44 to form a complete scraper ring.

Figure 16:
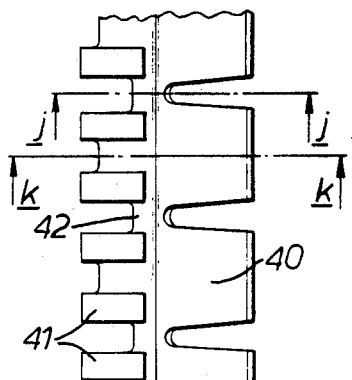
FIG. 16 is a view of the strip before bending into a circle.
Figure 17:
FIG. 17 is a section on line j—h in FIG. 16.
Figure 18:
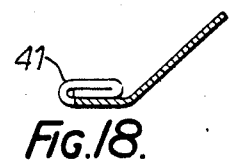
FIG. 18 is a section on line k—k in FIG. 16.

Referring to FIGS. 16 to 18, the spring leaves 40 are formed as a continuous strip of convenient length from suitable spring material, for example by punching and press forming. Each leaf 40 is secured by two integral rolled members 41. To provide flexibility for bending to enter the housing, the material between the leaves is removed to leave narrow connecting pieces 42.

Figure 14:
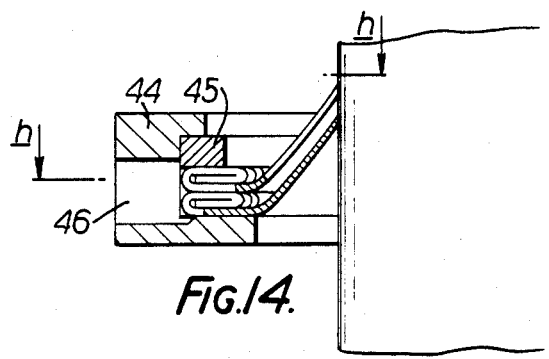
FIG. 14 is a half-axial section through a fourth embodiment of scraper ring.
Figure 15:
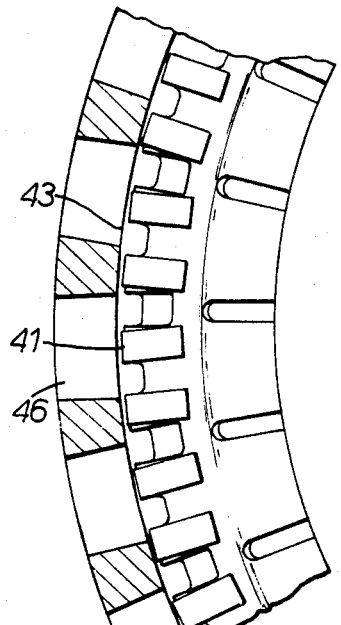
FIG. 15 is a view of the spring leaves on section line h—h in FIG. 14.

Referring now to FIGS. 14 and 15, the strips are seated in a recess 43 in the housing 44, two or more rows being used, the leaves 40 in adjacent rows being staggered. The leaves 40 are secured by a locking ring 45, or by some other suitable method. The gaps formed between the rolled sections 41 provide drainage slots which communicate with passages 46 in the housing. The diameter of the recess 43 is chosen to allow a whole number of spring leaves to be used and as the leaves are intended to be relatively small and the ratio of number of leaves to diameter of rod relatively high, any diameter of rod can be accommodated by a slight change in the deflection in the spring leaf. If the strips 40 are produced as a continuous length then, by suitable disposition in the housing, the strip could be wound in helical form to produce two or more turns as described above.

In a preferred method the strips are produced by mouldings in the form shown in FIGS. 19 to 23.

Figure 21:
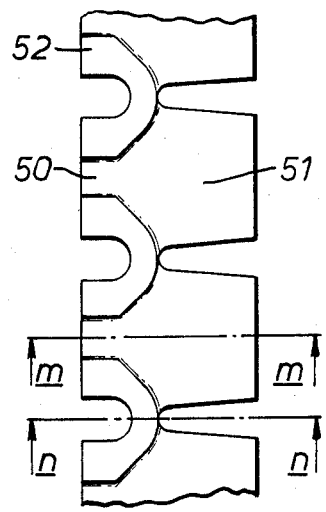
FIG. 21 is a view of the strip before bending into a circle.
Figure 22:
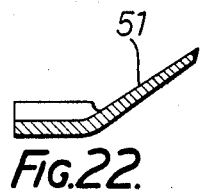
FIG. 22 is a section on line m—m in FIG. 21.
Figure 23:
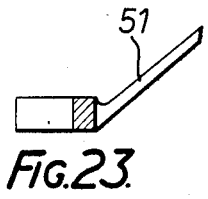
FIG. 23 is a section on line n—n in FIG. 21.

Referring to FIGS. 21 to 23 a strip 50 may be produced in either straight lengths as shown, or curved lengths, the curve not necessarily being the same as the final intended curvature in the housing. Leaves 51 are formed on one side of the strip and on the opposite side are alternating thicker portions 52 of U-form which provide the flexibility for bending and also provide slots for drainage.

Figure 19:
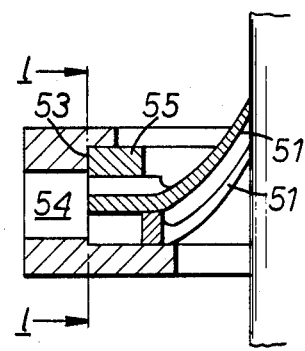
FIG. 19 is a half-axial section through a fifth embodiment of scraper ring.
Figure 20:
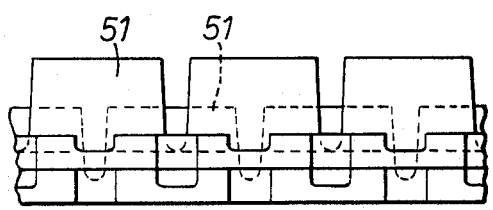
FIG. 20 is a developed view of the spring leaves with housing removed on line l—l in FIG. 19.

FIGS. 19 and 20 show how two or more staggered rows of spring leaves 51 are positioned in a recess in the housing 53, with drain passage 54, and secured by a locking ring 55.

The blades or leaves 51 may be made of a metallic material having the necessary spring characteristics, in addition to suitable resistance to wear and compatibility with the environment, such as, for example, hard bronze, spring temper steel or stainless steel. Alternatively, a plastics material can be used either with or without reinforcement and preferred material of this type is polyetheretherketone reinforced with carbon fibre.

Although as described the rings are suitable for scraping only in one direction, which is the usual requirement, a two-way ring can be constructed by using two sets of any of the spring leaves described above arranged back to back.

So far, the invention has been described as applying to the external cylindrical surface of a piston rod, but it is understood that it may equally be applicable to internal cylindrical surfaces when, in effect, the constructions illustrated would be turned inside out. The scraper ring need not be stationary but may have relative motion against a stationary surface.

Figure 24:
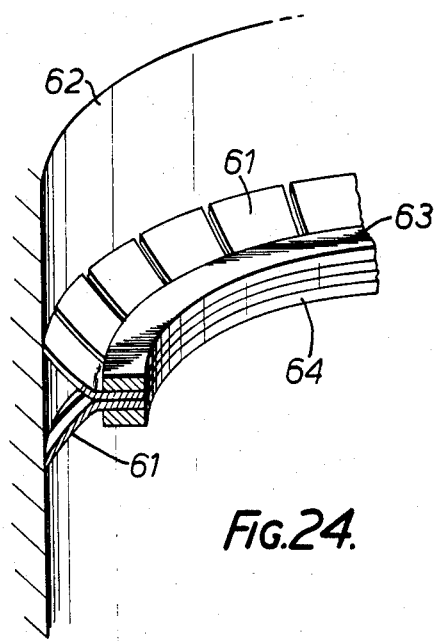
FIG. 24 is a partial isometric sketch of a scraper ring for use as a piston ring.
Figure 25:
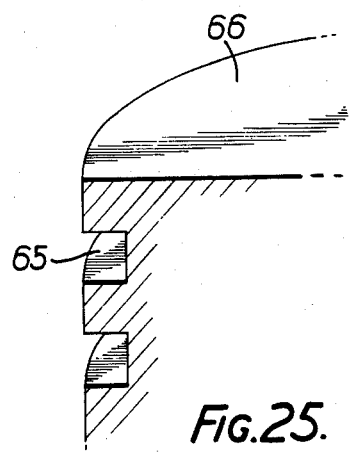
FIG. 25 is a partial vertical schematic section through a piston.

FIGS. 24 and 25 illustrate a scraper ring system for a piston in a cylinder in an internal combustion engine. The system comprises a pair of spring leaves 61, similar to that shown in FIG. 21, which are staggered and arranged "back to back" i.e. with the leaves 61 of the two rows inclined away from each other aginst the cylinder wall 62. The two rows are clamped together by a pair of clamping rings 63, 64 and the assembly is located in one of the piston ring grooves 65 in a piston 66. In use therefore, the upper ring of leaves 61 will scrape oil on the up-stroke and the lower ring of leaves 61 will scrape oil on the down-stroke.

The inner periphery of the ring assembly will sit in the groove 65 and the assembly will be free to move in the normal way. The inner periphery will perform the normal piston ring function of providing a seal against gases or oil passing round between the ring and the groove.

Although not specifically described, any of the scraper rings described with reference to a piston rod could be modified for use as a piston ring.

With the constructions proposed it is possible that the scraping edges of the blades or leaves will not conform exactly to the curvature of the mating surface until they have bedded-in during the initial wear phase. Where this may be unacceptable, the contact edges may be trimmed or machined to produce the correct conformability in the operating position.

There are various methods of achieving this, some of which are described below for piston rods but are equally applicable to cylinders.

One method is to use a lapping technique where the lap is the same size as the piston rod so the blades conform to the operating position.

Another known technique of supporting flimsy workpieces is that of surrounding them by a filler material so that machining may be carried out in a conventional way. Suitable filler materials are, for example, hard wax, resin, pitch or low-melting point metallic alloys, all of which may be poured as liquids and will harden at room temperature so supporting the component, or part of the component, which they surround or embed. After machining, the filler is melted out.

Using this technique, a mandrel would be entered into the scraper ring which would have a diameter rather less than the operating diameter to provide an allowance for machining with the blades or leaves in their operating position. The mandrel and scraper ring would then be placed in a mould and the filler poured in and allowed to set. The mandrel would then be withdrawn and the blades would be machined to the correct diameter. Afterwards, the filler would be melted out.

Not all the fillers mentioned above are suitable since many tend to bond to the surfaces of the component and do not part cleanly when melted out. To overcome this problem, it is proposed to use water for the filler material.

After fitting the mandrel into the ring, the assembly is placed in a mould which is filled with water. The whole is then frozen to a temperature of $-15°$ C. or lower. The mandrel is withdrawn, to facilitate which, a release agent may be used to coat the mandral, or the mandrel may be heated internally only sufficiently to melt the immediate ice surface, afterwards, the assembly is refrozen. The tips of the blades or spring leaves are then bored out. The temperature of freezing is chosen to permit this operation to be completed before the ice thaws. Subsequently, it is only necessary to allow the ring to thaw out and to dry it by gentle heat. This technique is clean, does not contaminate the surfaces and there is no elevation of temperature to affect the material or the spring temper of the leaves. It also uses an imexpensive filler.

Insulating material can be incorporated in the mould or in the ice to minimise heat absorption during machining, especially where contact is made with machining fixtures and clamps.

Obviously, numerous modifications and variations of the present invention are possible on the light of the above teachings. It is therefore to be understood that within the scope of the appended claims, the invention may be practiced otherwise that as specifically described herein.

I claim:

1. A scraper ring system for removing fluid from a relatively moving cylindrical surface said system comprising a plurality of overlapping blades each of said blades having a contact edge arranged to press against said cylindrical surface at an acute angle to the axis of said cylindrical surface, the apex of said acute angle pointing in a direction opposite to the relative motion of said cylindrical surface when material is to be removed therefrom; said blades forming part of a continuous strip.

2. A scraper ring system according to claim 1 wherein said blades are arranged in two or more rows spaced axially of the cylindrical surface, and wherein said blades in adjacent rows are relatively staggered.

3. A scraper ring system according to claim 1 including spring means which encircles said blades and urges them into contact with said cylindrical surface.

4. A scraper ring system according to claim 1 wherein said strip is resilient and said blades are held in contact with said cylindrical surface by said resilience of said strip.

5. A scraper ring system according to claim 1 wherein said blades are resilient and are made of polyetheretherketone reinforced with carbon fibres.

6. The method of forming the surface contacting scraper edge of the blades of a scraper ring as described in claim 1 including the steps of arranging said blades in the desired circular orientation; maintaining said desired circular orientation by surrounding said blades with a liquid; freezing said liquid with the blades therein; machining said blades to form the desired surfaces contacting curvature thereon while the blades are held by said frozen liquid; and melting said frozen liquid.

7. A scraper ring system according to claim 3 further including channels extending through said housing for discharging the fluid removed from said cylindrical surface.

8. The method of forming the surface contacting edge of the blades of a scraper ring as described in claim 6 including the further step of incorporating a filler into the liquid to add toughness to the frozen liquid.

9. The method of forming the surface contacting edge of the blades of a scraper ring as described in claim 6 including the further step of adding pieces of insulating material to the liquid before freezing to minimize heat transfer.

10. The method of forming the surface contacting edge of the blades of a scraper ring as described in claim 6 wherein the liquid is water.

11. A scraper ring for removing fluid from a relatively moving cylindrical surface said ring comprising: an annular housing surrounding said cylindrical surface and radially spaced from said surface, a plurality of resilient blades secured to said housing in overlapping relationship; each of said blades having a radially inner circular edge in contact with the cylindrical surface, said blades being resilient and arranged to form a circular inner edge of a diameter normally less than that of said cylindrical surface whereby the blades are caused by the cylindrical surface to bend in the axial direction of the cylindrical surface with the resilience of said blades holding them in scraping contact with and at an acute angle to the cylindrical surface, the apex of the acute angle assumed by the blades pointing in a direction opposite to the direction of motion of the cylindrical surface when material is to be scraped from that surface.

12. A scraper ring a described in claim 11 wherein said blades are arranged in two annular rounds spaced axially of the cylindrical surface, the blades of each of the rounds being arranged to form a circular inner edge of substantially the same diameter and the blades of both rounds being bent in the same axial direction.

13. A scraper ring as described in claim 12 wherein the blades in each round are arranged in side by side relationship with the blades of one round overlapping the blades of the other round.

14. A scraper ring as described in claim 13 wherein said blades in each round are individual segments each secured to said housing.

15. A scraper ring as described in claim 13 wherein said blades in each round are segments, said segments being radially inwardly extending fingers joined together adjacent their radially outer edges to form a part of a continuous strip.

16. A scraper ring as described in claim 11 wherein the blades are individual segments each secured to said housing.

17. A scraper ring as described in claim 11 wherein said blades are segments, said segments being radially inwardly extending fingers joined together adjacent their radially outer edges to form a part of a continuous strip.

18. A scraper ring for removing fluid from a relatively moving cylindrical surface said ring comprising: an annular housing radially spaced from said surface, a plurality of resilient blades secured to said housing in overlapping relationship; each of said blades having a radial edge in contact with the cylindrical surface, said radial edge being spaced from said housing, said blades being resilient and arranged to from a circle of a diameter different from that of said cylindrical surface and creating an annular area of interfering overlap between the blades and the cylindrical surface whereby the blades are caused by the cylindrical surface to bend in the axial direction of the cylindrical surface with the resilience of said blades holding them in scraping contact with and at an acute angle the cylindrical surface, the apex of the acute angle assumed by the blades pointing in a direction opposite to the direction of movement of the cylindrical surface when material is being scraped from the surface.

19. A scraper ring as described in claim 18 wherein said housing is surrounded by said cylindrical surface and the diameter of the circle formed by the edges of the blades is greater than that of the cylindrical surface and said blades are arranged in two annular rounds, the blades of each of the rounds being arranged to form a circular outer edge of substantially the same diameter, the blades of the one round being bent by the cylindrical surface in an axial direction opposite to the direction of bending of the blades of the other round whereby the blades of the scraper ring point opposite to each of the directions of movement of the cylindrical surface when it is relative reciprocate movement.

20. A scraper ring as described in claim 19 wherein the blades in each of the rounds are arranged in overlapping relationship to each other.

21. A scraper ring as described in claim 18 wherein said housing is surrounded by said cylindrical surface and the diameter of the circle formed by the edges of the blades is greater than that of the cylindrical surface, the blades being arranged to overlap each other.

* * * * *